(12) United States Patent
Mixter

(10) Patent No.: US 10,535,343 B2
(45) Date of Patent: Jan. 14, 2020

(54) IMPLEMENTATIONS FOR VOICE ASSISTANT ON DEVICES

(71) Applicant: GOOGLE LLC., Mountain View, CA (US)

(72) Inventor: Kenneth Mixter, Los Altos Hills, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/592,137

(22) Filed: May 10, 2017

(65) Prior Publication Data

US 2017/0329573 A1    Nov. 16, 2017

Related U.S. Application Data

(60) Provisional application No. 62/336,551, filed on May 13, 2016, provisional application No. 62/336,566, (Continued)

(51) Int. Cl.
*G10L 15/22* (2006.01)
*H04N 21/40* (2011.01)
(Continued)

(52) U.S. Cl.
CPC .............. *G10L 15/22* (2013.01); *G06F 3/167* (2013.01); *H04M 1/271* (2013.01); *H04M 3/493* (2013.01);
(Continued)

(58) Field of Classification Search
CPC ....................................................... G10L 15/22
(Continued)

(56) References Cited

U.S. PATENT DOCUMENTS 5,659,665 A    8/1997  Whelpley, Jr.
5,774,859 A    6/1998  Houser et al.
(Continued)

FOREIGN PATENT DOCUMENTS

WO    WO 2012/103321       8/2012
WO    WO 2012/103321 A2    8/2012
(Continued)

OTHER PUBLICATIONS

Google LLC, International Preliminary Report on Patentability, PCT/US2017/032002, dated Nov. 13, 2018, 7 pgs.
(Continued)

*Primary Examiner* — Shaun Roberts
(74) *Attorney, Agent, or Firm* — Morgan, Lewis & Bockius LLP

(57) ABSTRACT

A method at an electronic device with an audio input system includes: receiving a verbal input at the device; processing the verbal input; transmitting a request to a remote system, the request including information determined based on the verbal input; receiving a response to the request, wherein the response is generated by the remote system in accordance with the information based on the verbal input; and performing an operation in accordance with the response, where one or more of the receiving, processing, transmitting, receiving, and performing are performed by one or more voice processing modules of a voice assistant library executing on the electronic device, the voice processing modules providing a plurality of voice processing operations that are accessible to one or more application programs and/or operating software executing or executable on the electronic device.

20 Claims, 5 Drawing Sheets

Related U.S. Application Data filed on May 13, 2016, provisional application No. 62/336,569, filed on May 13, 2016, provisional application No. 62/336,565, filed on May 13, 2016, provisional application No. 62/334,434, filed on May 10, 2016.

(51) Int. Cl.

| | |
|---|---|
| *H04N 21/20* | (2011.01) |
| *H04N 21/4722* | (2011.01) |
| *H04N 21/4147* | (2011.01) |
| *H04N 21/47* | (2011.01) |
| *G06F 3/16* | (2006.01) |
| *H04N 5/44* | (2011.01) |
| *H04N 5/445* | (2011.01) |
| *H04N 21/239* | (2011.01) |
| *H04N 21/41* | (2011.01) |
| *H04N 21/422* | (2011.01) |
| *H04M 1/27* | (2006.01) |
| *H04M 3/493* | (2006.01) |

(52) U.S. Cl.
CPC ....... *H04N 5/4403* (2013.01); *H04N 5/44582* (2013.01); *H04N 21/20* (2013.01); *H04N 21/2393* (2013.01); *H04N 21/40* (2013.01); *H04N 21/4104* (2013.01); *H04N 21/4147* (2013.01); *H04N 21/42203* (2013.01); *H04N 21/47* (2013.01); *H04N 21/4722* (2013.01); *G10L 2015/223* (2013.01); *H04N 2005/4442* (2013.01)

(58) Field of Classification Search
USPC .......................................... 704/231, 270, 275
See application file for complete search history.

(56) References Cited

U.S. PATENT DOCUMENTS

| | | | |
|---|---|---|---|
| 6,195,641 B1* | 2/2001 | Loring | G10L 15/30 704/270 |
| 6,397,186 B1 | 5/2002 | Bush | |
| 6,681,380 B1 | 1/2004 | Britton et al. | |
| 7,260,538 B2 | 8/2007 | Calderone et al. | |
| 7,660,715 B1 | 2/2010 | Thambiratnam | |
| 7,698,131 B2* | 4/2010 | Bennett | G06F 17/2775 704/215 |
| 7,721,313 B2 | 5/2010 | Barrett | |
| 8,150,699 B2* | 4/2012 | Patch | 704/275 |
| 8,340,975 B1 | 12/2012 | Rosenberger | |
| 8,538,757 B2* | 9/2013 | Patch | 704/251 |
| 9,324,322 B1 | 4/2016 | Torok et al. | |
| 9,338,493 B2 | 5/2016 | Van Os et al. | |
| 9,424,840 B1 | 8/2016 | Hart | |
| 9,443,527 B1 | 9/2016 | Watanabe et al. | |
| 9,554,632 B2 | 1/2017 | Tarnow et al. | |
| 9,721,570 B1 | 8/2017 | Beal | |
| 9,794,613 B2 | 10/2017 | Jang et al. | |
| 9,967,644 B2 | 5/2018 | Chawan et al. | |
| 9,990,002 B2 | 6/2018 | Kim | |
| 10,026,401 B1 | 7/2018 | Mutagi et al. | |
| 2003/0120744 A1 | 6/2003 | Kessler | |
| 2004/0001095 A1* | 1/2004 | Marques | G06F 3/002 715/771 |
| 2005/0033582 A1 | 2/2005 | Gadd | |
| 2005/0144293 A1 | 6/2005 | Limont et al. | |
| 2006/0036642 A1 | 2/2006 | Horvitz et al. | |
| 2006/0075429 A1 | 4/2006 | Istvan et al. | |
| 2006/0276230 A1 | 12/2006 | McConnell | |
| 2007/0192486 A1 | 8/2007 | Wilson et al. | |
| 2007/0198267 A1 | 8/2007 | Jones | |
| 2008/0010652 A1 | 1/2008 | Booth | |
| 2008/0065388 A1 | 3/2008 | Cross | |
| 2008/0167860 A1* | 7/2008 | Goller | G10L 15/28 704/201 |
| 2008/0180572 A1 | 7/2008 | Pickett et al. | |
| 2008/0208569 A1 | 8/2008 | Simpson | |
| 2008/0228496 A1 | 9/2008 | Yu | |
| 2009/0100478 A1 | 4/2009 | Craner | |
| 2009/0178071 A1 | 7/2009 | Whitehead | |
| 2009/0319276 A1 | 12/2009 | Chang et al. | |
| 2010/0064218 A1 | 3/2010 | Bull | |
| 2010/0240307 A1 | 9/2010 | Sims | |
| 2010/0250239 A1* | 9/2010 | Itakura | G06F 17/30011 704/10 |
| 2010/0265397 A1 | 10/2010 | Dasher et al. | |
| 2011/0161076 A1 | 6/2011 | Davis | |
| 2011/0161085 A1 | 6/2011 | Boda | |
| 2011/0283243 A1 | 11/2011 | Eckhardt et al. | |
| 2011/0311206 A1 | 12/2011 | Hubner | |
| 2012/0035924 A1 | 2/2012 | Jitkoff | |
| 2012/0096497 A1 | 4/2012 | Xiong et al. | |
| 2012/0198339 A1* | 8/2012 | Williams | H04L 65/4092 715/727 |
| 2012/0226981 A1 | 9/2012 | Clavin | |
| 2012/0239661 A1 | 9/2012 | Giblin | |
| 2012/0253822 A1* | 10/2012 | Schalk | G01C 21/3608 704/270.1 |
| 2012/0260192 A1 | 10/2012 | Detweiler | |
| 2012/0265528 A1 | 10/2012 | Gruber | |
| 2013/0046773 A1 | 2/2013 | Kannan | |
| 2013/0080177 A1 | 3/2013 | Chen | |
| 2013/0132094 A1* | 5/2013 | Lim | G10L 15/22 704/E11.001 |
| 2013/0138424 A1 | 5/2013 | Koenig | |
| 2013/0290110 A1 | 10/2013 | LuVogt | |
| 2013/0322634 A1 | 12/2013 | Bennett | |
| 2013/0332159 A1 | 12/2013 | Federighi et al. | |
| 2013/0332311 A1 | 12/2013 | Pu et al. | |
| 2013/0339850 A1 | 12/2013 | Hardi | |
| 2014/0006483 A1 | 1/2014 | Garmark et al. | |
| 2014/0074483 A1 | 3/2014 | Van Os | |
| 2014/0108019 A1 | 4/2014 | Ehsani | |
| 2014/0125271 A1 | 5/2014 | Wang | |
| 2014/0163978 A1 | 6/2014 | Basye et al. | |
| 2014/0244266 A1 | 8/2014 | Brown | |
| 2014/0244568 A1 | 8/2014 | Goel | |
| 2014/0257788 A1 | 9/2014 | Xiong et al. | |
| 2014/0278435 A1 | 9/2014 | Ganong, III | |
| 2014/0297268 A1 | 10/2014 | Govrin | |
| 2014/0317502 A1 | 10/2014 | Brown et al. | |
| 2014/0333449 A1 | 11/2014 | Thiesfeld et al. | |
| 2014/0365226 A1 | 12/2014 | Sinha | |
| 2014/0365887 A1 | 12/2014 | Cameron | |
| 2015/0006182 A1* | 1/2015 | Schmidt | G10L 15/30 704/275 |
| 2015/0081296 A1 | 3/2015 | Lee et al. | |
| 2015/0097666 A1 | 4/2015 | Boyd | |
| 2015/0112985 A1 | 4/2015 | Roggero et al. | |
| 2015/0154976 A1* | 6/2015 | Mutagi | H04L 12/281 704/275 |
| 2015/0162006 A1 | 6/2015 | Kummer | |
| 2015/0169284 A1 | 6/2015 | Quast et al. | |
| 2015/0199566 A1 | 7/2015 | Moore et al. | |
| 2015/0261496 A1 | 9/2015 | Faaborg et al. | |
| 2015/0331666 A1* | 11/2015 | Bucsa | G10L 15/30 704/275 |
| 2015/0365787 A1 | 12/2015 | Farrell | |
| 2016/0179462 A1 | 6/2016 | Bjorkengren | |
| 2016/0323343 A1 | 11/2016 | Sanghavi et al. | |
| 2017/0010587 A1 | 1/2017 | Champy et al. | |
| 2017/0068423 A1 | 3/2017 | Napolitano et al. | |
| 2017/0090858 A1 | 3/2017 | Paris | |
| 2017/0154628 A1* | 6/2017 | Mohajer | G10L 15/30 |
| 2017/0180499 A1 | 6/2017 | Gelfenbeyn et al. | |
| 2017/0262537 A1 | 9/2017 | Harrison et al. | |
| 2017/0270927 A1 | 9/2017 | Brown et al. | |
| 2017/0300831 A1 | 10/2017 | Gelfenbeyn et al. | |
| 2017/0329766 A1 | 11/2017 | Matsuyama | |
| 2017/0339444 A1 | 11/2017 | Shaw et al. | |

(56) References Cited

U.S. PATENT DOCUMENTS

2017/0347477 A1 11/2017 Avital
2018/0004482 A1 1/2018 Johnston et al.
2018/0041408 A1 2/2018 Dagum et al.

FOREIGN PATENT DOCUMENTS

WO WO 2014/001914 A2 1/2014
WO WO 2014/064531 A1 5/2014

OTHER PUBLICATIONS

Google, International Search Report/Written Opinion, PCT/US2017/032002, dated Aug. 25, 2017, 9 pgs.
Google LLC, International Preliminary Report on Patentability, PCT/US2017/032511, dated Nov. 13, 2018, 6 pgs.
Google Inc., International Search Report/Written Opinion, PCT/US2017/032511, dated Jul. 21, 2017, 8 pgs.
Google LLC, International Preliminary Report on Patentability, PCT/US2017/032262, dated Nov. 13, 2018, 8 pgs.
Google Inc., International Search Report/Written Opinion, PCT/US2017/032262, dated Aug. 24, 2017, 10 pgs.
Google LLC, International Preliminary Report on Patentability, PCT/US2017/032260, dated Nov. 13, 2018, 7 pgs.
Google Inc., International Search Report/Written Opinion, PCT/US2017/032260, dated Aug. 23, 2017, 9 pgs.
Google LLC, International Preliminary Report on Patentability, PCT/US2017/032263, dated Nov. 13, 2018, 8 pgs.
Google Inc., International Search Report/Written Opinion, PCT/US2017/032263, dated Aug. 23, 2017, 10 pgs.

\* cited by examiner

IMPLEMENTATIONS FOR VOICE ASSISTANT ON DEVICES

RELATED APPLICATIONS

This application claims the benefit of the following provisional applications, which are incorporated by reference herein in their entirety:

U.S. Provisional Application No. 62/336,551, titled "Personalized and Contextualized Audio Briefing," filed May 13, 2016;

U.S. Provisional Application No. 62/336,566, titled "LED Design Language for Visual Affordance of Voice User Interfaces," filed May 13, 2016;

U.S. Provisional Application No. 62/336,569, titled "Voice-Controlled Closed Caption Display," filed May 13, 2016;

U.S. Provisional Application No. 62/336,565, titled "Media Transfer among Media Output Devices," filed May 13, 2016; and U.S. Provisional Application No. 62/334,434, titled "Implementations for Voice Assistant on Devices," filed May 10, 2016.

TECHNICAL FIELD

This application relates generally to computer technology, including but not limited to voice assistants for devices and related libraries.

BACKGROUND

Voice-based assistants that interact with a user through audio/voice input and output have grown in popularity alongside the growth of the Internet and cloud computing. These assistants can provide an interface for the consumption of digital media, as well as providing various types of information, including news, sports scores, weather, and stocks, to name a few examples.

A user may have multiple devices where voice-based assistant functionality is desirable. It is desirable to have a voice-based assistant that can be implemented and used across a variety of devices, that can provide a consistent experience across the variety of devices, and that can support functionality specific to a particular device.

SUMMARY

The implementations described in this specification are directed to embedding or including a voice assistant in embedded systems and/or devices in a way that enables control of the local device for a wide variety of operating system platforms.

In accordance with some implementations, a thin, low-resource-usage device-side library has features including local processing of audio data, listening for wakewords or hotwords, and sending user requests. Additional features include connectivity to a cloud brain, extensible voice action control system, portability layer allowing integration into many diverse operating environments, and capability to be updated asynchronously to the rest of the client software.

The described implementations have an advantage of providing a similar user experience for interacting with a voice assistant across many different devices.

The described implementations have another advantage of enabling decoupled innovation in the voice assistant capabilities from the innovations enabled from the device itself. For example, if an improved recognition pipeline was created, it could be pushed out to devices, while the device manufacturer needs not do anything to receive it, and can still benefit from previous voice commands.

In accordance with some implementations, a method at an electronic device with an audio input system, one or more processors, and memory storing one or more programs for execution by the one or more processors includes: receiving a verbal input at the device; processing the verbal input; transmitting a request to a remote system, the request including information determined based on the verbal input; receiving a response to the request, wherein the response is generated by the remote system in accordance with the information based on the verbal input; and performing an operation in accordance with the response, where one or more of the receiving, processing, transmitting, receiving, and performing are performed by one or more voice processing modules of a voice assistant library executing on the electronic device, the voice processing modules providing a plurality of voice processing operations that are accessible to one or more application programs and/or operating software executing or executable on the electronic device.

In some implementations, a device-agnostic voice assistant library for electronic devices including an audio input system, includes: one or more voice processing modules configured to execute on a common operation system implemented on a plurality of different electronic device types, the voice processing modules providing a plurality of voice processing operations that are accessible to application programs and operating software executing on the electronic devices, thereby enabling portability of voice-enabled applications configured to interact with one or more of the voice processing operations.

In some implementations, an electronic device includes an audio input system, one or more processors, and memory storing one or more programs to be executed by the one or more processors. The one or more programs include instructions for: receiving a verbal input at the device; processing the verbal input; transmitting a request to a remote system, the request including information determined based on the verbal input; receiving a response to the request, wherein the response is generated by the remote system in accordance with the information based on the verbal input; and performing an operation in accordance with the response, where one or more of the receiving, processing, transmitting, receiving, and performing are performed by one or more voice processing modules of a voice assistant library executing on the electronic device, the voice processing modules providing a plurality of voice processing operations that are accessible to one or more application programs and/or operating software executing or executable on the electronic device.

In some implementations, a non-transitory computer readable storage medium stores one or more programs. The one or more programs include instructions which, when executed by an electronic device with an audio input system and one more processors, causes the electronic device to: receive a verbal input at the device; process the verbal input; transmit a request to a remote system, the request including information determined based on the verbal input; receive a response to the request, wherein the response is generated by the remote system in accordance with the information based on the verbal input; and perform an operation in accordance with the response, where one or more of the receiving, processing, transmitting, receiving, and performing are performed by the one or more voice processing modules of the voice assistant library executing on the electronic device, the voice processing modules providing a plurality of voice processing operations that are accessible to one or more application programs and/or operating software executing or executable on the electronic device.

BRIEF DESCRIPTION OF THE DRAWINGS

Like reference numerals refer to corresponding parts throughout the drawings.

DESCRIPTION OF IMPLEMENTATIONS

Figure 1:
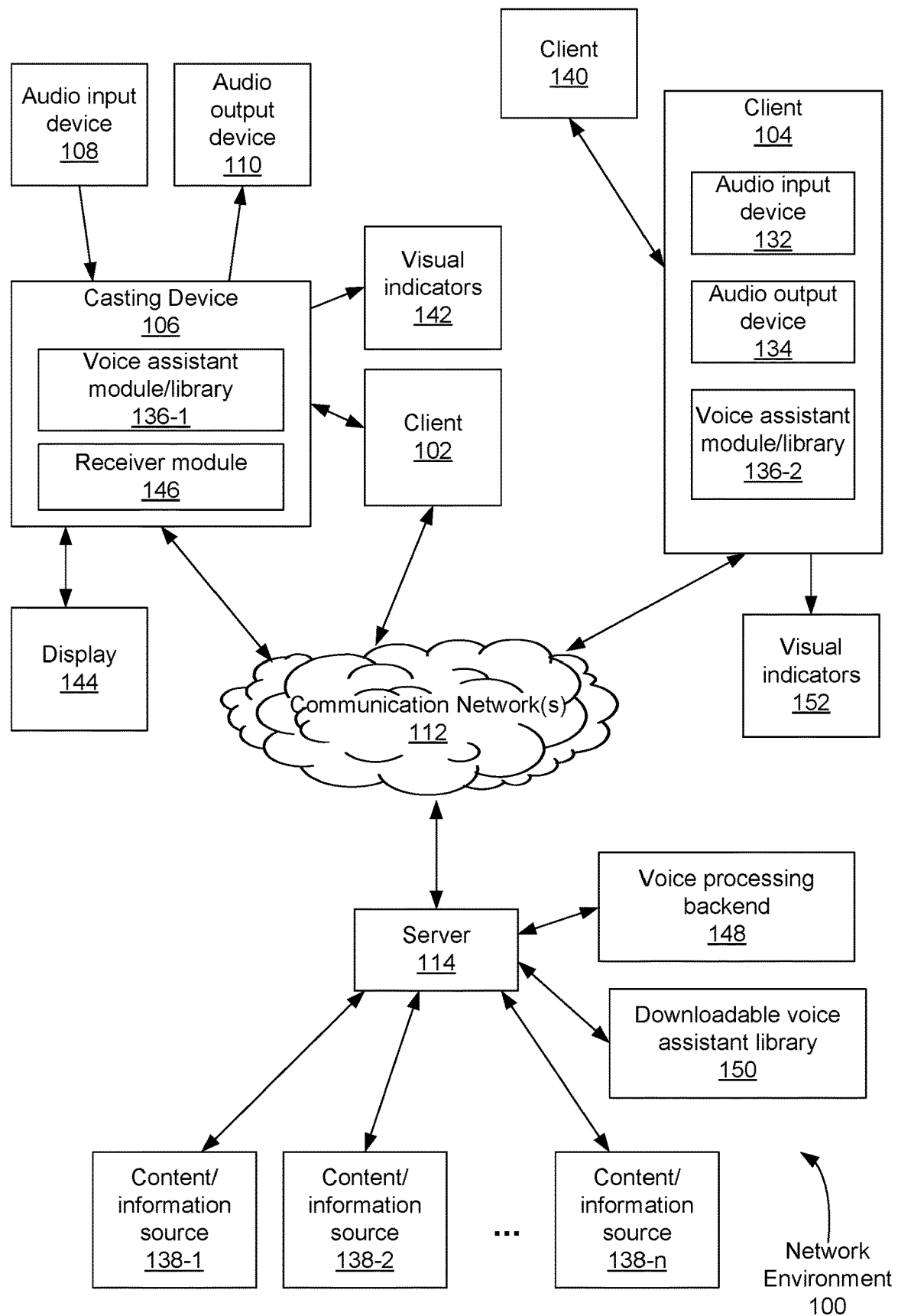
FIG. 1 is a block diagram illustrating an example network environment in accordance with some implementations.

Reference will now be made in detail to various implementations, examples of which are illustrated in the accompanying drawings. In the following detailed description, numerous specific details are set forth in order to provide a thorough understanding of the invention and the described implementations. However, the invention may be practiced without these specific details. In other instances, well-known methods, procedures, components, and circuits have not been described in detail so as not to unnecessarily obscure aspects of the implementations.

In some implementations, an objective of a voice assistant is to provide users a personalized voice interface available across a variety of devices and enabling a wide variety of use cases, providing consistent experience throughout a user's day. The voice assistant and/or related functionality may be integrated into first-party and third-party products and devices.

An example use case involves media. Voice commands may be used to initiate playback and control of music, radio, podcasts, news, and other audio media through voice. For example, a user can utter voice commands (e.g., "play jazz music," "play 107.5 FM," "skip to next song," "play 'Serial'") to play or control various types of audio media. Further, such commands may be used to play audio media from a variety of sources, such as online streaming of terrestrial radio stations, music subscription services, local storage, remote storage, and so on. Further, the voice assistant may utilize integrations that are available with casting devices to support additional content.

Another example use case involves remote playback. The user may issue a voice command to a casting device that includes the voice assistant functionality, and in accordance to the voice command, media is played back on (e.g., casted to) a device specified in the command, on the devices in a specified group of one or more devices, or on one or more devices in an area specified in the command. The user can also specify generic categories or specific content in the command, and the appropriate media is played in accordance with the specified category or content in the command.

A further example use case is non-media, such as productivity features (e.g., timers, alarm clocks, calendar), home automation, questions and answers powered by a search engine (e.g., search queries), fun (e.g., assistant personality, jokes, games, Easter eggs), and everyday tasks (e.g., transportation, navigation, food, finance, gifts, etc.).

In some implementations, the voice assistant is provided as an optional feature of a casting device, and the voice assistant functionality may be updated as part of the casting device.

In some implementations, detection of hotwords or keywords in voice commands and verbal inputs from users is performed by the application processor (e.g., performed at the client device or casting device to which the user speaks the voice command or verbal input). In some implementations, detection of hotwords is performed by an external digital signal processor (e.g., performed by a server system processing the voice commands, as opposed to the client or casting device to which the user speaks the voice command or verbal input).

In some implementations, a device with the voice assistant feature includes one or more of: far-field support, "push to assist" or "push to talk" (e.g., a button to initiate voice assistant functionality), and AC power.

In some implementations, the voice assistant includes application programming interfaces (APIs) for one or more of: audio input (e.g., microphone, media loopback for ongoing playback), microphone state (e.g., on/off), ducking (e.g., reducing the volume of all outputs when the assistant is triggered through either hotword or push to talk), and new assistant events and status messages (e.g., assistant was triggered (e.g., heard hotword, pushed assistant button), listening to speech, waiting on server, responding, responding finished, alarm/timer is playing).

In some implementations, the device with the voice assistant functionality may communicate with another device for configuration purposes (e.g., with a configuration application on a smartphone), to enable or facilitate the functionality of the voice assistant on the device (e.g., setup the voice assistant functionality on the device, provide tutorials to the user). The configurations or setups may include specifying a device location, association with a user account, user opt-in to voice control, linking to and prioritizing media services (e.g., video streaming services, music streaming services), home automation configurations, etc.

In some implementations, the device with the voice assistant may include one or more user interface elements or indications to the user. One or more of the user interface elements are physical (e.g., as light patterns displayed using one or more LEDs, as sound patterns output by the speaker), and may include one or more of: a "push to assist" or "push to talk" trigger not dependent on a hotword, a "mute microphone" trigger and visual status indication, an "awaiting hotword status" visual indication, a "hotword detected" visual indication, an "assistant is actively listening" visual indication visible at some distance (e.g., 15 feet), an "assistant is working/thinking" visual indication, a "voice message/notification is available" visual indication, a "volume level" control method and status indicator, and a "pause/resume" control method. In some implementations, these physical user interface elements are provided by the client device or casting device. In some implementations, the voice assistant supports a common set of user interface elements or indications across different devices, for consistency of experience across the different devices.

In some implementations, the voice assistant supports device-specific commands and/or hotwords as well as a standardized, predefined set of commands and/or hotwords.

FIG. 1 illustrates a network environment 100 in accordance with some implementations. The network environment 100 includes a casting device 106 and/or a voice assistant client device 104. The casting device 106 (e.g., CHROMECAST by GOOGLE INC.) is directly or otherwise communicatively coupled to an audio input device 108 (e.g., a microphone) and an audio output device 110 (e.g., one or more speakers). In some implementations, both the audio input device 108 and the audio output device 110 are components of a device (e.g., speaker system, television, sound bar) communicatively coupled to the casting device 106. In some implementations, the audio input device 108 is a component of the casting device 106, and the audio output device 110 is a component of a device to which the casting device 106 is communicatively coupled, or vice versa. In some implementations, the audio input device 108 and the audio output device 110 are components of the casting device 106.

In some implementations, the casting device 106 is communicatively coupled to a client 102. The client 102 may include an application or module (e.g., a casting device settings app) that facilitates configuration of the casting device 106, including voice assistant features.

In some implementations, the casting device 106 is coupled to a display 144.

In some implementations, the casting device 106 includes one or more visual indicators 142 (e.g., LED lights).

In some implementations, the casting device 106 includes a receiver module 146. In some implementations, the receiver module 146 operates the casting device 106, including hardware functions and communicating with a content source, for example. In some implementations, there are different receiver modules 146 at the casting device 106 for different content sources. In some implementations, the receiver module 146 includes respective sub-modules for different content sources.

The voice assistant client device 104 (e.g., a smartphone, a laptop or desktop computer, a tablet computer, a voice command device, a mobile device or in-vehicle system with GOOGLE ASSISTANT by GOOGLE INC., GOOGLE HOME by GOOGLE INC.) includes an audio input device 132 (e.g., a microphone) and an audio output device 134 (e.g., one or more speakers, headphones). In some implementations, a voice assistant client device 104 (e.g., voice command device, a mobile device or in-vehicle system with GOOGLE ASSISTANT by GOOGLE INC., GOOGLE HOME by GOOGLE INC.) is communicatively coupled to a client 140 (e.g., a smartphone, a tablet device). The client 140 may include an application or module (e.g., a voice command device settings app) that facilitates configuration of the voice assistant client device 104, including voice assistant features.

In some implementations, the voice assistant client device 104 includes one or more visual indicators 152 (e.g., LED lights). An example of a voice assistant client device with visual indicators (e.g., LED lights) is illustrated in FIG. 4A of U.S. Provisional Application No. 62/336,566, titled "LED Design Language for Visual Affordance of Voice User Interfaces," filed May 13, 2016, which is incorporated by reference herein in its entirety.

The casting device 106 and the voice assistant client device 104 include respective instances of a voice assistant module or library 136. The voice assistant module/library 136 is a module/library that implements voice assistant functionality across a variety of devices (e.g., casting device 106, voice assistant client device 104). The voice assistant functionality is consistent across the variety of devices, while still allowing for device-specific features (e.g., support for controlling device-specific features through the voice assistant). In some implementations, the voice assistant module or library 136 is the same or similar across devices; instances of the same library can be included in a variety of devices.

In some implementations, depending on the type of device, the voice assistant module/library 136 is included in an application installed in the device, in the device operating system, or embedded in the device (e.g., embedded in the firmware).

In some implementations, the voice assistant module/library 136-1 at the casting device 106 communicates with the receiver module 146 to perform voice assistant operations.

In some implementations, the voice assistant module/library 136-1 at the casting device 106 can control or otherwise affect the visual indicators 142.

In some implementations, the voice assistant module/library 136-2 at the voice assistant client device 104 can control or otherwise affect the visual indicators 152.

The casting device 106 and the voice assistant client device 104 are communicatively coupled to a server system 114 through one or more communicative networks 112 (e.g., local area networks, wide area networks, the Internet). The voice assistant module/library 136 detects (e.g., receives) verbal input picked up (e.g., captured) by the audio input device 108/132, processes the verbal input (e.g., to detect hotwords), and transmits the processed verbal input or an encoding of the processed verbal input to the server 114. The server 114 receives the processed verbal input or an encoding thereof, and processes the received verbal input to determine the appropriate response to the verbal input. The appropriate response may be content, information, or instructions or commands or metadata to the casting device 106 or voice assistant client device 104 to perform a function or operation. The server 114 sends the response to the casting device 106 or voice assistant client device 104, where the content or information is output (e.g., output through audio output device 110/134) and/or a function is performed. As part the processing, the server 114 may communicate with one or more content or information sources 138 to obtain content or information, or references to such, for the response. In some implementations, the content or information sources 138 include, for example, search engines, databases, information associated with the user's account (e.g., calendar, task list, email), websites, and media streaming services. In some implementations, a voice assistant client device 104 and a casting device 106 may communicate or interact with each other. Examples of such communication or interaction, as well as example operations of a voice assistant client device 104 (e.g., GOOGLE HOME by GOOGLE INC.) are described in U.S. Provisional Application No. 62/336,566, titled "LED Design Language for Visual Affordance of Voice User Interfaces," filed May 13, 2016, U.S. Provisional Application No. 62/336,569, titled "Voice-Controlled Closed Caption Display," filed May 13, 2016, and U.S. Provisional Application No. 62/336,565, titled "Media Transfer among Media Output Devices," filed May 13, 2016, all of which are incorporated by reference herein in their entirety.

In some implementations, the voice assistant module/library 136 receives verbal input captured by the audio input device 108/132 and transmits the verbal input (with no or little processing) or an encoding thereof to the server 114. The server 114 processes the verbal input to detect hotwords, determine an appropriate response, and send the response to the casting device 106 or voice assistant client device 104.

If the server 114 determines that the verbal input includes a command for the casting device 106 or the voice assistant client device 104 to perform a function, the server 114 transmits in the response instructions or metadata that instructs the casting device 106 or the voice assistant client device 104 to perform the function. The function may be specific to the device, and capability for supporting such functions in the voice assistant may be included in the casting device 106 or client 104 as a custom module or function added or linked to the voice assistant module/library 136.

In some implementations, the server 114 includes, or is coupled to, a voice processing backend 148 that performs the verbal input processing operations and determines responses to the verbal inputs.

In some implementations, the server 114 includes downloadable voice assistant library 150. The downloadable voice assistant library 150 (e.g., same as voice assistant library 136, or an update thereof) may include new features and functionality or updates, and can be downloaded to add the voice assistant library to a device or to update a voice assistant library 136.

Figure 2:
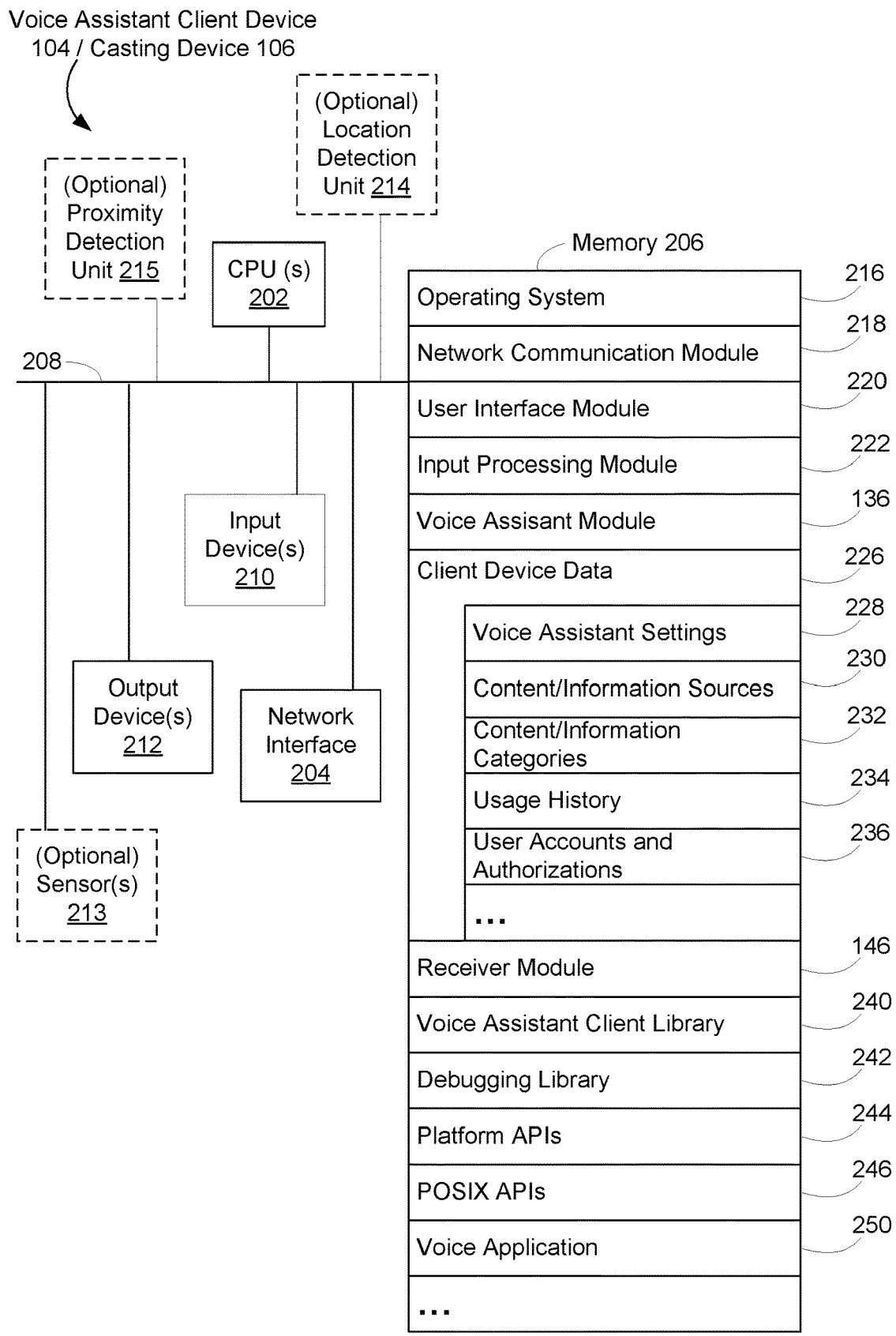
FIG. 2 is a diagram illustrating an example voice assistant client device in accordance with some implementations.

FIG. 2 is a block diagram illustrating an example voice assistant client device 104 or casting device 106 of a network environment 100 in accordance with some implementations. Examples of the voice assistant client device 104 include, but are not limited to, a mobile phone, a tablet computer, a laptop computer, a desktop computer, a wireless speaker (e.g., GOOGLE HOME by GOOGLE INC.), a voice command device (e.g., GOOGLE HOME by GOOGLE INC.), a television, a soundbar, a casting device (e.g., CHROMECAST by GOOGLE INC.), a media streaming device, a home appliance, a consumer electronics device, an in-vehicle system, and a wearable personal device. The voice assistant client device 104 (e.g., GOOGLE HOME by GOOGLE INC., a mobile device with GOOGLE ASSISTANT capability) or casting device 106 (e.g., CHROMECAST by GOOGLE INC.), typically, includes one or more processing units (CPUs) 202, one or more network interfaces 204, memory 206, and one or more communication buses 208 for interconnecting these components (sometimes called a chipset). The voice assistant client device 104 or casting device 106 includes one or more input devices 210 that facilitate user input, including an audio input device 108 or 132 (e.g., a voice-command input unit or microphone) and optionally other input devices such as a keyboard, a mouse, a touch screen display, a touch-sensitive input pad, a gesture capturing camera, or other input buttons or controls). In some implementations, a voice assistant client device 102 uses a microphone and voice recognition, or a camera and gesture recognition, to supplement or replace the keyboard. The voice assistant client device 104 or casting device 106 also includes one or more output devices 212, including an audio output device 110 or 134 (e.g., one or more speakers, headphones or the like), and optionally one or more visual displays (e.g., display 144) and/or one or more visual indicators 142 or 152 (e.g., LEDs) that enable presentation of user interfaces and display content and information. Optionally, the voice assistant client device 104 or casting device 106 includes a location detection unit 214, such as a GPS (global positioning satellite) or other geo-location receiver, for determining the location of the voice assistant client device 104 or casting device 106. The voice assistant client device 104 or casting device 106 may optionally also include a proximity detection device 215, e.g., an IR sensor, for determining a proximity of the voice assistant client device 104 or casting device 106 to other objects (e.g., the user-wearer in the case of a wearable personal device). Optionally, the voice assistant client device 104 or casting device 106 includes sensor(s) 213 (e.g., accelerometer, gyroscope, etc.).

Memory 206 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 206, optionally, includes one or more storage devices remotely located from one or more processing units 202. Memory 206, or alternatively the non-volatile memory within memory 206, includes a non-transitory computer readable storage medium. In some implementations, memory 206, or the non-transitory computer readable storage medium of memory 206, stores the following programs, modules, and data structures, or a subset or superset thereof:

- Operating system 216 including procedures for handling various basic system services and for performing hardware dependent tasks;
- Network communication module 218 for connecting the voice assistant client device 104 or casting device 106 to other devices (e.g., the server system 114, client 102, 140, other voice assistant client devices 104 or casting devices 106) via one or more network interfaces 204 (wired or wireless) and one or more networks 112, such as the Internet, other wide area networks, local area networks, metropolitan area networks, and so on;
- User interface module 220 for enabling presentation of information at the voice assistant client device 104 or casting device 106 via one or more output devices 212 (e.g., displays, speakers, etc.);
- Input processing module 222 for processing one or more user inputs or interactions captured or received by the one or more input devices 210 and interpreting the input or interaction;
- Voice assistant module 136 for processing verbal inputs, providing the verbal inputs to the server 114, receiving responses from the server 114, and outputting the responses; and
- Client data 226 for storing at least data associated with the voice assistant module 136, including:
  - Voice assistant settings 228 for storing information associated with settings and configurations for the voice assistant module 136 and voice assistant functionality;
  - Content/information sources 230 and categories 232 for storing predefined and/or user-specified sources and categories of content or information;
  - Usage history 234 for storing information associated with the operation and usage of the voice assistant module 136 (e.g., logs), such as commands and requests received, responses to the commands and requests, operations performed in response to commands and requests, and so on; and
  - User Accounts and authorizations 236 for storing one or more users' authorizations and authentication information to access the users' respective accounts at content/information sources 230 and account information for those authorized accounts; and
  - Receiver module 146 for operating the casting functionality of a casting device 106, including communicating with content sources to receive content for playback.

In some implementations, the voice assistant client device 104 or casting device 106 includes one or more libraries and one or more application programming interfaces (APIs) for voice assistant and related functionality. These libraries may be included in or linked to by the voice assistant module 136 or receiver module 146. The libraries include modules associated with voice assistant functionality or other functions that facilitated voice assistant functionality. The APIs provide interfaces to hardware and other software (e.g., operating system, other applications) that facilitate voice assistant functionality. For example, a voice assistant client library 240, debugging library 242, platform APIs 244, and POSIX APIs 246 may be stored in memory 206. These libraries and APIs are further described below with reference to FIG. 4.

In some implementations, the voice assistant client device 104 or casting device 106 includes a voice application 250 that uses the modules and functions of the voice assistant client library 240, and optionally debugging library 242, platform APIs 244, and POSIX APIs 246. In some implementations, the voice application 250 is a first-party or third-party application that is voice-enabled through use of the voice assistant client library 240, etc.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 206, optionally, stores a subset of the modules and data structures identified above. Furthermore, memory 206, optionally, stores additional modules and data structures not described above.

Figure 3:
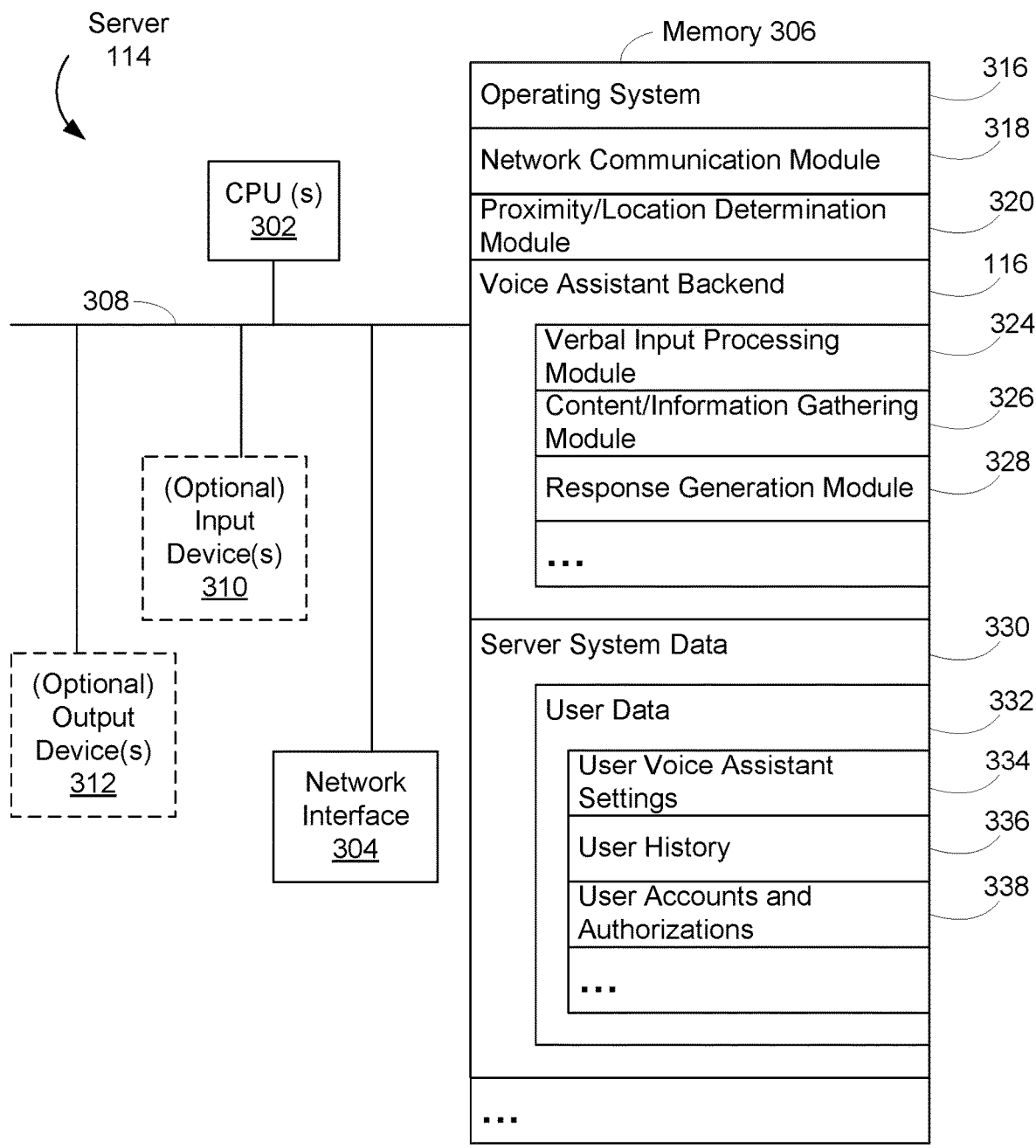
FIG. 3 is a diagram illustrating an example server system in accordance with some implementations.

FIG. 3 is a block diagram illustrating an example server system 114 of a network environment 100 in accordance with some implementations. The server 114 typically includes one or more processing units (CPUs) 302, one or more network interfaces 304, memory 306, and one or more communication buses 308 for interconnecting these components (sometimes called a chipset). The server 114 optionally includes one or more input devices 310 that facilitate user input, such as a keyboard, a mouse, a voice-command input unit or microphone, a touch screen display, a touch-sensitive input pad, a gesture capturing camera, or other input buttons or controls. Furthermore, the server 114 may use a microphone and voice recognition or a camera and gesture recognition to supplement or replace the keyboard. In some implementations, the server 114 optionally includes one or more cameras, scanners, or photo sensor units for capturing images, for example, of graphic series codes printed on the electronic devices. The server 114 optionally also includes one or more output devices 312 that enable presentation of user interfaces and display content, including one or more speakers and/or one or more visual displays.

Memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 306, optionally, includes one or more storage devices remotely located from one or more processing units 302. Memory 306, or alternatively the non-volatile memory within memory 306, includes a non-transitory computer readable storage medium. In some implementations, memory 306, or the non-transitory computer readable storage medium of memory 306, stores the following programs, modules, and data structures, or a subset or superset thereof:

- Operating system 316 including procedures for handling various basic system services and for performing hardware dependent tasks;
- Network communication module 318 for connecting the server system 114 to other devices (e.g., voice assistant client device 104, casting device 106, client 102, client 140) via one or more network interfaces 304 (wired or wireless) and one or more networks 112, such as the Internet, other wide area networks, local area networks, metropolitan area networks, and so on;
- Proximity/location determination module 320 for determining the proximity and/or location of the voice assistant client device 104 or casting device 106 based on the location information of the client device 104 or casting device 106;
- Voice assistant backend 116 for processing voice assistant verbal inputs (e.g., verbal inputs received from voice assistant client devices 104 and casting devices 106), including one or more of:
  - Verbal input processing module 324 to process verbal inputs to identify commands and requests in the verbal inputs;
  - Content/information gathering module 326 to gather content and information response to the commands and requests; and
  - Response generation module 328 to generate verbal outputs responsive to the commands and requests and to populate the verbal outputs with responsive content and information; and
- Server system data 330 storing at least data associated with operation of a voice assistant platform, including:
  - User data 332 for storing information associated with users of the voice assistant platform, including:
    - User voice assistant settings 334 for storing voice assistant settings information corresponding to voice assistant settings 228, and information corresponding to content/information sources 230 and categories 232;
    - User history 336 for storing users' histories with the voice assistant (e.g., logs), including histories of commands and requests and corresponding responses; and
    - User accounts and authorizations 338 for storing users' authorizations and authentication information to access the users' respective accounts at content/information sources 230 and account information for those authorized accounts, corresponding to user accounts and authorizations 236.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above.

In some implementations, the voice assistant module 136 (FIG. 2) includes one or more libraries. A library includes modules or sub-modules that perform respective functions.

For example, a voice assistant client library includes modules that perform voice assistant functions. The voice assistant module 136 may also include one or more application programming interfaces (APIs) for cooperating with specific hardware (e.g., hardware on the client or casting device), specific operating software, or remote systems.

In some implementations, a library includes modules that supports audio signal processing operations, including, for example, bandpass, filtering, erasing, and hotword detection. In some implementations, a library includes modules for connecting to backend (e.g., server-based) speech processing systems. In some implementations, a library includes modules for debugging (e.g., debugging speech recognition, debugging hardware issues, automated testing).

Figure 4:
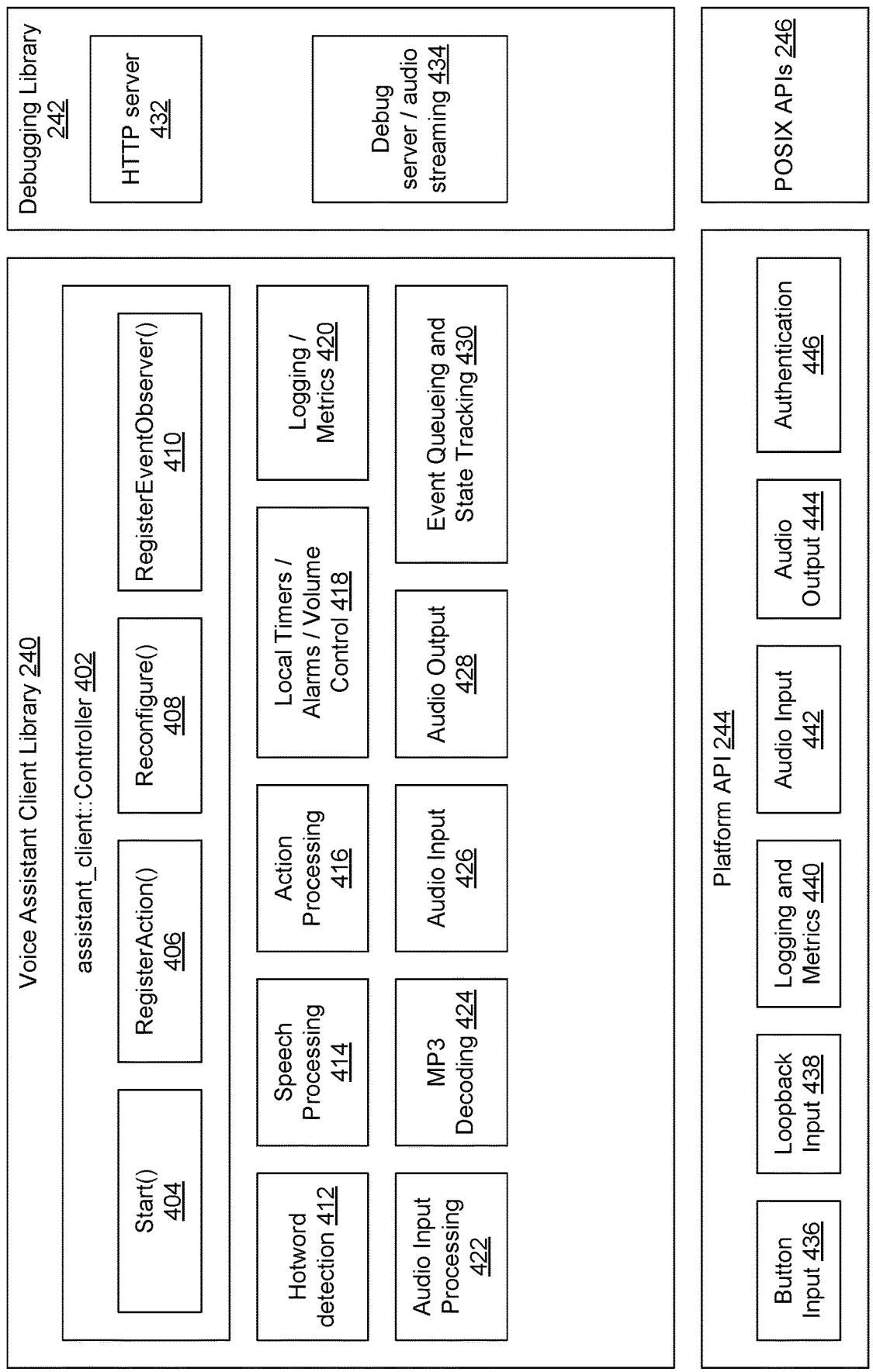
FIG. 4 is a block diagram illustrating a functional view of voice assistant libraries, in accordance with some implementations.

FIG. 4 illustrates the libraries and APIs that may be stored in a voice assistant client device 104 or casting device 106, and run by the voice assistant module 136 or another application. The libraries and APIs may include a voice assistant client library 240, a debugging library 242, a platform API 244, and POSIX APIs 246. Applications at the voice assistant client device 104 or casting device 106 (e.g., voice assistant module 136, other applications that may want to support cooperation with the voice assistant) may include or link to, and run, the libraries and APIs to provide or support voice assistant functionality in the application. In some implementations, the voice assistant client library 240 and the debugging library 242 are separate libraries; keeping the voice assistant client library 240 and the debugging library 242 libraries separate facilitates different release and update procedures that accounts for the different security implications of these libraries.

In some implementations, the libraries are flexible; the libraries may be used across multiple device types and incorporate the same voice assistant functionality.

In some implementations, the libraries depend on standard shared objects (e.g., standard Linux shared objects), and thus are compatible with different operating systems or platforms that use these standard shard objects (e.g., various Linux distributions and flavors of embedded Linux).

In some implementations, the POSIX APIs 246 provide standard APIs for compatibility with various operating systems. Thus, the voice assistant client library 240 may be included in devices of different POSIX-compliant operating systems and the POSIX APIs 246 provides a compatibility interface between the voice assistant client library 240 and the different operating systems.

In some implementations, the libraries include modules to support and facilitate base use cases available across the different types of devices that implement the voice assistant (e.g., timers, alarms, volume control).

In some implementations, the voice assistant client library 240 includes a controller interface 402 that includes functions or modules for starting, configuring, and interacting with the voice assistant. In some implementations, the controller interface 402 includes a "Start( )" function or module 404 for starting the voice assistant at the device; a "RegisterAction( )" function or module 406 for registering an action with the voice assistant (e.g., so that the action may be actionable via the voice assistant), a "Reconfigure( )" 408 function for re-configuring the voice assistant with updated settings, and a "RegisterEventObserver( )" function 410 for registering with the assistant a set of functions for basic events.

In some implementations, the voice assistant client library 240 includes multiple functions or modules associated with particular voice assistant functionality. For example, a hotword detection module 412 processes voice inputs to detect hotwords. A speech processing module 414 processes speech in voice inputs, and converts speech to text or vice versa (e.g., identifying words and phrases, speech-to-textual-data conversion, textual-data-to-speech conversion). The action processing module 416 performs actions and operations responsive to verbal inputs. A local timers/alarms/volume control module 418 facilitates alarm clock, timer, and volume control functionality at the device and control of same by voice input (e.g., maintain timers, clocks, alarm clocks at the device). A logging/metrics module 420 records (e.g., logs) voice inputs and responses, as well as determining and recording related metrics (e.g., response time, idle time, etc.). An audio input processing module 422 processes the audio of voice inputs. An MP3 decoding module 424 decodes MP3-encoded audio. An audio input module 426 captures audio through an audio input device (e.g., a microphone). An audio output module 428 outputs audio through an audio output device (e.g., a speaker). An event queueing and state tracking module 430 for queuing events associated with the voice assistant at the device and tracking a state of the voice assistant at the device.

In some implementations, the debugging library 242 provides modules and functions for debugging. For example, HTTP server module 432 facilitates debugging of connectivity issues, and debug server/audio streaming module 434 for debugging audio issues.

In some implementations, the platform API 244 provides an interface between the voice assistant client library 240 and hardware functionality of the device. For example, the platform API includes a button input interface 436 for capturing button inputs on the device, a loopback audio interface 438 for capturing loopback audio, a logging and metrics interface 440 for logging and determining metrics, an audio input interface 442 for capturing audio input, an audio output interface 444 for outputting audio, and an authentication interface 446 for authenticating a user with other services that may interact with the voice assistant. An advantage of the voice assistant client library organization depicted in FIG. 4 is that it enables the same or similar voice processing functionality to be provided on a wide range of voice assistant device types with a consistent APIs and sets of voice assistant functions. This consistency supports portability of voice assistant applications and consistency of voice assistant operations, which in turn promotes consistent user interactions and familiarity with voice assistant applications and functions that execute on different device types. In some implementations, all or part of the voice assistant client library 240 may be provided at the server 114 to support server-based voice assistant applications (e.g., server applications that operate on voice inputs transmitted to the server 114 for processing).

Example code of classes and functions corresponding to the controller 402 ("Controller") and related classes are shown below. These classes and functions can be employed via common APIs by applications that are executable on a variety of devices.

The class "ActionModule" below facilitates an application registering its own modules to handle commands provided by the voice assistant server:

```
// The application can register its own software modules
// to handle commands provided by the voice assistant server.
    class ActionModule {
        public:
// An action result describes if an action was executed successfully.
            class Result {
                public:
                    virtual ~Result( ) = default;
// Set the action result to indicate success.
                    virtual void SetOk( ) = 0;
```

-continued

```
// Set the action result to the given response code and human
// readable string.
            virtual void SetError(int response_code,
                    const std::string& str);
        };
// Arguments to an action handler.
        class Args {
            public:
                virtual ~Args( ) = 0;
// Get the serialized protobuf data for a given typed action handler
// argument.
                virtual bool GetProtobufDataFromType
                    (std::string type,std::string*
                            data) = 0;
        };
            virtual ~ActionModule( ) = 0;
// Returns the name of this module.
            virtual std::string GetName( ) = 0;
// Handles the given |action_name| with its |args|, and updates result
// according to the outcome of the action execution.
            virtual void Handle(std::string action_name,
                    std::unique_ptr<Args> args, Result* result) = 0;
// Sets a named protobuf to given serialized data to indicate to the
// voice assistant the local state of this module.
            virtual bool GetModuleContext(std::string* protobuf_type,
                    std::string* protobuf_data) = 0;
    };
```

The class "BuildInfo" below may be used to describe the application running the voice assistant client library 240 or the voice assistant client device 104 itself (e.g., with identifiers or version numbers of the application, the platform, and/or the device):

```
// Build information used for describing the application
// running the voice assistant client library. For dedicated voice
// assistant devices, this should describe the device.
// This object will be returned from CreateDefaultBuildInfo, can be
// modified, and then set back on a Settings object.
        class BuildInfo {
            public:
                virtual ~BuildInfo( ) = default;
// Sets the application version.
                virtual void SetApplicationVersion(const std::string&
                        application_version) = 0;
// Sets the install identifier. This must be a device-specific identifier
// that should not be the same as any other device or user identifier.
                virtual void SetInstallId(const std::string&
                        install_id) = 0;
// Sets the platform identifier.
                virtual void SetPlatformId(const std::string&
                        platform_id) = 0;
// Sets the platform version.
                virtual void SetPlatformVersion(const std::string&
                        platform_version) = 0;
// Sets the device model. Optional.
                virtual void SetDeviceModel(const std::string&
                        device_model) = 0;
    };
```

The class "EventDelegate" below defines functions associated with basic events, such as start of speech recognition, start and completion of the voice assistant outputting a voice response, etc.:

```
// Receives events from the Assistant library.
    class EventDelegate {
        public:
            class RecognizedSpeechChangedEvent {
                public:
                    virtual ~RecognizedSpeechChangedEvent( ) { }
```

```
// Indicates the updated recognized text from the voice assistant. If part
// of OnRecognizedSpeechFinishedEvent, this indicates the final
// recognized text.
                    virtual std::string
                        GetRecognizedSpeech( ) = 0;
            };
            virtual ~EventDelegate( ) { }
// Indicates the voice assistant client library is booting up.
            virtual void OnBootingUpEvent( ) = 0;
// Indicates the hotword was heard.
            virtual void OnHeardHotwordEvent( ) = 0;
// Indicates recognition of speech has started. Speech recognition will
// continue until OnRecognizingSpeechFinishedEvent is received.
            virtual void OnRecognizingSpeechStartedEvent( ) = 0;
// Indicates a change to the current hypothesis of recognized speech has
// occurred. |event| indicates the new hypothesis.
            virtual void OnRecognizedSpeechChangedEvent(
                    const RecognizedSpeechChangedEvent& event) = 0;
// Indicates the final speech recognition has occurred.
// |event| indicates the final value.
            virtual void OnRecognizingSpeechFinishedEvent(
                    const RecognizedSpeechChangedEvent& event) = 0;
// Indicates the voice assistant is starting to respond by voice.
// The voice assistant will be responding until
// OnRespondingFinishedEvent is received.
            virtual void OnRespondingStartedEvent( ) = 0;
// Indicates the voice assistant has finished responding by voice.
            virtual void OnRespondingFinishedEvent( ) = 0;
// Indicates the alarm has started sounding. The alarm will continue
// sounding until OnAlarmSoundingFinishedEvent is received.
            virtual void OnAlarmSoundingStartedEvent( ) = 0;
// Indicates the alarm has finished sounding.
            virtual void OnAlarmSoundingFinishedEvent( ) = 0;
// Indicates the timer has started sounding. The timer will continue
// sounding until OnTimerSoundingFinishedEvent is received.
            virtual void OnTimerSoundingStartedEvent( ) = 0;
// Indicates the timer has finished sounding.
            virtual void OnTimerSoundingFinishedEvent( ) = 0;
// Indicates a volume change has occurred to the default volume (which
// occurs when a user says "turn up the volume" for instance, without
// specifying alarm or another specific volume kind.) |new_volume|
// indicates the new default volume from 0.0 to 1.0.
            virtual void OnDefaultVolumeChangeEvent(float
                    new_volume) = 0;
// Indicates the voice assistant client library is out of date with the
// server and needs to be updated. When this occurs, the client will
// no longer interact with the server.
            virtual void OnClientLibraryOutOfDateEvent( ) = 0;
    };
```

The class "DefaultEventDelegate" below defines functions for do-nothing overrides for certain events:

```
// Provides a default do-nothing implementation of an EventDelegate,
// useful for overriding only those functions that are interesting.
    class DefaultEventDelegate : public EventDelegate {
        public:
            void OnBootingUpEvent( ) override { }
            void OnHeardHotwordEvent( ) override { }
            void OnRecognizingSpeechStartedEvent( ) override { }
            void OnRecognizedSpeechChangedEvent(const
                    RecognizedSpeechChangedEvent& event) override { }
            void OnRecognizingSpeechFinishedEvent(const
                    RecognizedSpeechChangedEvent& event) override { }
            void OnRespondingStartedEvent( ) override { }
            void OnRespondingFinishedEvent( ) override { }
            void OnAlarmSoundingStartedEvent( ) override { }
            void OnAlarmSoundingFinishedEvent( ) override { }
            void OnTimerSoundingStartedEvent( ) override { }
            void OnTimerSoundingFinishedEvent( ) override { }
            void OnDefaultVolumeChangeEvent(float new_volume)
                override { }
            void OnClientLibraryOutOfDateEvent( ) override { }
    };
```

The class "Settings" below defines settings (e.g., locale, geolocation, file system directory) that may be provided to the controller 402.

```
// Assistant settings that are provided to the controller. They must be
// provided to the controller when starting the Assistant. They can also
// be updated and then provided to the Reconfigure function to take effect.
// The embedding app should not create its own classes derived from this.
    class Settings {
        public:
            virtual ~Settings( ) { }
// Creates a default BuildInfo object.
            virtual std::unique_ptr<BuildInfo>
                CreateDefaultBuildInfo( ) = 0;
// Sets the geolocation of the device. Optional.
            virtual void SetGeolocation(const Geolocation&
                geolocation) = 0;
// Sets the build information of the device.
            virtual void SetBuildInfo(const BuildInfo&
                build_info) = 0;
// Sets a file system directory the voice assistant client library can use.
// This directory should be cleared whenever the voice assistant client
// library should lose all previous context, such as when a factory data
// reset occurs.
            virtual void SetAssistantDirectory(const
                std::string& path) = 0;
// Sets the UserAgent to pass in connections to the server.
            virtual void SetUserAgent(const std::string&
                user_agent) = 0;
// Sets the locale of the device.
            virtual void SetLocaleInfo(const LocaleInfo&
                locale_info) = 0;
    };
```

The class "Controller" below corresponds to the controller 402, and the Start( ), Reconfigure( ) RegisterAction( ) and RegisterEventObserver( ) functions correspond to functions Start( ) 404, Reconfigure( ) 408, RegisterAction( ) 406, and RegisterEventObserver( ) 410, respectively.

```
// Controller class of the assistant.
    class Controller {
        public:
            virtual ~Controller( ) { }
// Creates a new default settings object that the application
// should configure and then pass to Start.
            virtual std::unique_ptr<Settings>
                CreateDefaultSettings( ) = 0;
// Starts the assistant and returns immediately. Returns true on success,
// false on failure. Will only succeed once per process. |settings| are the
// settings for the Assistant module. These are passed by const reference
// so it is clear the caller retains the Settings object and that any
// subsequent changes have no effect unless passed to Reconfigure. This
// function will fail if any required settings are not set.
            virtual bool Start(const Settings& settings) = 0;
// Reconfigures the running assistant and returns immediately. Returns
// false on failure including if the assistant is not yet started.
// |settings| are the new settings for the voice assistant module. This
// function will fail if any required settings are not set.
            virtual bool Reconfigure(const Settings& settings) = 0;
// Registers an action |module|. Fails if already registered.
            virtual bool
                RegisterAction(std::unique_ptr<ActionModule>
                    module) = 0;
// Registers the EventDelegate to receive all assistant events.
            virtual void RegisterEventObserver(
                std::unique_ptr<EventDelegate> delegate) = 0;
// Call this function to create the controller class which controls the
// Assistant. |platform| must be set to a pointer to the platform API that
// the assistant will use. Returns nullptr on error.
            static ASSISTANT_EXPORT std::unique_ptr<Controller>
                Create(std::unique_ptr<PlatformApi> platform_api);
    };
```

In some implementations, the voice assistant client device 104 or casting device 106 implements a platform (e.g., a set of interfaces for communicating with other devices using the same platform, and an operating system configured to support the set of interfaces). The example code below illustrates the functions associated with an interface for the voice assistant client library 402 to interact with the platform.

The class "Authentication" below defines an authentication token for authenticating the user of the voice assistant with certain accounts:

```
// Authentication provider for the platform.
    class Authentication {
        public:
// Returns the authentication scope of an authentication token.
            virtual std::string GetGoogleOAuth2Scopes( ) = 0;
// Returns the authentication token.
            virtual bool GetGoogleOAuth2Token(std::string*
                token) = 0;
        protected:
            virtual ~Authentication( ) = default;
    };
```

The class "OutputStreamType" below defines types of audio output streams:

```
// The possible types of audio output stream.
    enum class OutputStreamType {
        kTts,
        kAlarm,
        kCalibration,
    };
```

The class "SampleFormat" below defines supported audio sample formats (e.g., PCM formats):

```
// The supported PCM sample formats.
    enum class SampleFormat {
        kInterleavedS16,    // Interleaved signed 16-bit integer.
        kInterleavedS32,    // Interleaved signed 32-bit integer.
        kInterleavedF32,    // Interleaved 32-bit float.
        kPlanarS16,         // Planar signed 16-bit integer.
        kPlanarS32,         // Planar signed 32-bit integer.
        kPlanarF32,         // Planar 32-bit float.
    };
```

"BufferFormat" below defines a format of data stored in an audio buffer at the device:

```
// Information about the format of data stored in an audio buffer.
    struct BufferFormat {
        int sample_rate;
        SampleFormat sample_format;
        int num_channels;
    };
```

The class "AudioBuffer" defines a buffer for audio data:

```
// Buffer class for input/output audio data.
    class AudioBuffer {
        public:
// Returns the format of the data in the buffer.
            virtual BufferFormat GetFormat( ) const = 0;
// Immutable data; used by the AudioInput delegate to read the incoming
// data.
            virtual const char* GetData( ) const = 0;
// Writable data; used by the AudioOutput delegate to write more
// data for output.
            virtual char* GetWritableData( ) const = 0;
```

-continued

```
// Returns the number of audio frames contained in
// GetData( )/GetWritableData( ).
            virtual int GetFrames( ) const = 0;
        protected:
            virtual ~AudioBuffer( ) { }
    };
```

The class "AudioOutput" below defines an interface for audio output:

```
// Interface for audio output.
    class AudioOutput {
        public:
            enum Error {
                kFatalError,
                kUnderrun,
            };
            class Delegate {
                public:
// Called when more output audio data is needed. The delegate
// implementation must fill data into the |buffer| as soon as possible,
// calling the |done_cb| once some data has been written. Note that
// the delegate may partially fill the buffer, but the number of
// |bytes_written| must be a multiple of the frame size. The delegate
// does not take ownership of the |buffer|.
// Note that this method must not block. If there is no data available
// to fill the buffer immediately, the buffer can be filled
// asynchronously by any thread, and then the |done_cb| must be called.
// The |done_cb| must not be called after the stream has been stopped
// by a call to Stop( ). If the end of stream has been reached, the
// delegate must call the |done_cb| with 0 |bytes_written|.
                    virtual void FillBuffer(AudioBuffer* buffer,
                        const std::function<void(int
                        frames_written)>& done_cb) = 0;
// Called to indicate that the end of stream (ie, the point where the
// delegate passed 0 |bytes_writted| to the |done_cb| of FillBuffer( )) has
// been played out. Once this is called, it is safe to call Stop( ) without
// risk of discarding any unplayed data.
                    virtual void OnEndOfStream( ) = 0;
// Called when an output error occurs.
                    virtual void OnError(Error error) = 0;
// Called once the output has been stopped. Once this method has been
// called, there will be no more calls to any delegate methods unless the
// output is started again.
                    virtual void OnStopped( ) = 0;
                protected:
                    ~Delegate( ) { }
            };
            virtual ~AudioOutput( ) { }
// Returns the stream type of this output, which was specified when the
// output was created.
            virtual OutputStreamType GetType( ) = 0;
// Starts audio output. This will begin requesting buffers in the given
// |format| by calling the |delegate|'s FillBuffer( ) method.
            virtual void Start(const BufferFormat& format,
                Delegate* delegate) = 0;
// Stops audio output, putting this interface in a state when Start( ) can
// safely be called again with a new audio format and delegate. Any
// unplayed data provided by the delegate should be discarded when
// Stop( ) is called.
// Once the stop is complete and no further calls to the delegate will be
// made, the delegate's OnStopped( ) method will be called.
            virtual void Stop( ) = 0;
// Sets the volume range for this output stream. The volume of this stream
// should track the default volume as long as that volume is within the
// |min_volume| <= volume <= |max_volume| range (so, use the default
// volume, but clamped to the given range). The |min_volume| and
// |max_volume| are values 0.0 <= v <= 1.0, and represent a fraction of
// the total possible output volume of the system.
            virtual void SetVolume(float min_volume, float
                max_volume) = 0;
    };
```

The class "AudioInput" below defines an interface for capturing audio input:

```
// Interface for capturing audio input. When started, this should capture
// audio from all microphones, and provide data from each microphone
// as a separate channel in the buffers provided to the delegate's
// OnBufferAvailable( ) method.
    class AudioInput {
        public:
            enum Error {
                kFatalError,
                kOverrun,
            };
            class Delegate {
                public:
// Called when more input audio data is available. The |timestamp| is
// the time in microseconds (relative to CLOCK_MONOTONIC_RAW
// epoch) that the data in |buffer| was captured (for loopback audio, it is
the
// timestamp when the data was expected to be played).
                    virtual void OnBufferAvailable(
                        const AudioBuffer& buffer,
                        int64_t timestamp) = 0;
// Called when an error occurs on the AudioInput.
                    virtual void OnError(Error error) = 0;
// Called once the input has been stopped. Once this method has been
// called, there will be no more calls to any delegate methods unless the
// input is started again.
                    virtual void OnStopped( ) = 0;
            };
            virtual ~AudioInput( ) { }
// Starts capturing audio input and passing it to the |delegate|'s
// OnBufferAvailable( ) method.
            virtual void Start(Delegate* delegate) = 0;
// Stops capturing audio input. Once the input is stopped and no more
calls
// to any delegate methods will be made, the delegate's OnStopped( )
// method will be called.
            virtual void Stop( ) = 0;
    };
```

The class "Resources" below defines access to system resources:

```
// Access to system resource files.
    class Resources {
        public:
            using ResourceLoadingCallback = std::function<void(
                const std::string& output)>;
            Resources( ) { }
            virtual ~Resources( ) { }
            virtual bool GetBuiltinHotwordData(
                const LocaleInfo* locale,
                const ResourceLoadingCallback& callback) = 0;
            virtual bool GetAlarmMp3(const
                ResourceLoadingCallback& callback) = 0;
            virtual bool GetTimerMp3(const
                ResourceLoadingCallback& callback) = 0;
            virtual bool GetCalibrationMp3(const
                ResourceLoadingCallback& callback) = 0;
            virtual bool GetVolumeChangeMp3(const
                ResourceLoadingCallback& callback) = 0;
            virtual bool GetSpeechRecognitionErrorMp3(
                const LocaleInfo* locale,
                const ResourceLoadingCallback& callback) = 0;
            virtual bool GetSpeechRecognitionStoppedMp3(
                const LocaleInfo* locale,
                const ResourceLoadingCallback& callback) = 0;
            virtual bool GetNoInternetMp3(const LocaleInfo* locale,
                const ResourceLoadingCallback& callback) = 0;
    };
```

The class "PlatformApi" below specifies a platform API (e.g., platform API 244) for the voice assistant client library 240:

```
// Platform API to be used the voice assistant.
    class PlatformApi {
    public:
        virtual ~PlatformApi( ) { }
// Returns an audio output interface for the desired |type| of stream.
// This is owned by the PlatformApi.
        virtual std::unique_ptr<AudioOutput> GetAudioOutput(
            OutputStreamType type) = 0;
// Returns an interface for capturing audio input.
        virtual std::unique_ptr<AudioInput> GetAudioInput( ) = 0;
// Returns an interface for capturing loopback audio. This is an
// "audio input" where the captured data is audio data that was about to
// be played out.
// The loopback audio may be captured after all mixing and
// postprocessing has been done, as soon as possible before sending to
// the output hardware.
        virtual std::unique_ptr<AudioInput>
            GetLoopbackInput( ) = 0;
        virtual Authentication& GetAuthentication( ) = 0;
    };
```

In some implementations, volume control may be handled outside of the voice assistant client library 240. For example, the system volume may be maintained by the device outside of the control of the voice assistant client library 240. As another example, the voice assistant client library 240 may still support volume control, but requests for volume control to the voice assistant client library 240 are directed to the device.

In some implementations, alarm and timer functionality in the voice assistant client library 240 may be disabled by the user or disabled when implementing the library at a device.

In some implementations, the voice assistant client library 240 also supports an interface to LEDs on the device, to facilitate display of LED animations on the device LEDs.

In some implementations, the voice assistant client library 240 may be included in or linked to by a casting receiver module (e.g., receiver module 146) at a casting device 106. The linkage between the voice assistant client library 240 and the receiver module 146 may include, for example, support for additional actions (e.g., local media playback), and support for control of LEDs on the casting device 106.

Figure 5:
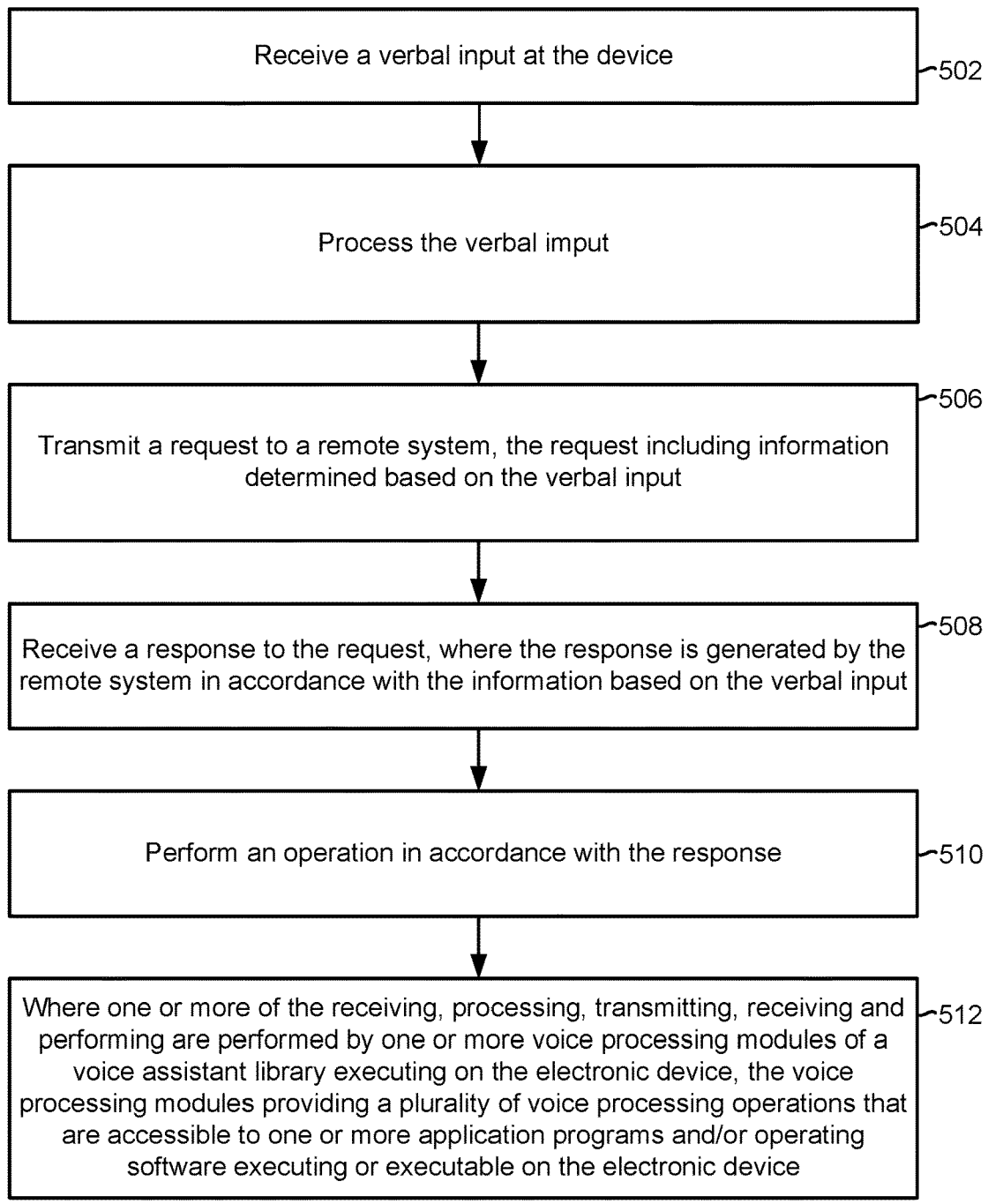
FIG. 5 is a flow diagram of a method for processing verbal inputs on a device, in accordance with some implementations.

FIG. 5 illustrates a flow diagram of a method 500 for processing verbal inputs on a device, in accordance with some implementations. The method 500 is performed at an electronic device (e.g., voice assistant client device 104, casting device 106) with an audio input system (e.g., audio input device 108/132), one or more processors (e.g., processing unit(s) 202), and memory (e.g., memory 206) storing one or more programs for execution by the one or more processors. In some implementations, an electronic device includes an audio input system (e.g., audio input device 108/132), one or more processors (e.g., processing unit(s) 202), and memory (e.g., memory 206) storing one or more programs to be executed by the one or more processors, the one or more programs including instructions for performing the method 500. In some implementations, a non-transitory computer readable storage medium stores one or more programs, the one or more programs including instructions which, when executed by an electronic device with an audio input system (e.g., audio input device 108/132) and one or more processors (e.g., processing unit(s) 202), causes the electronic device to perform the method 500. The programs or instructions for performing the method 500 may be included in the modules, libraries, etc. described above with reference to FIGS. 2-4.

The device receives (502) a verbal input at the device. The client device 104/casting device 106 captures a verbal input (e.g., voice input) uttered by a user.

The device processes (504) the verbal input. The client device 104/casting device 106 processes the verbal input. The processing may include hotword detection, conversion to textual data, and identification of words and phrases corresponding to commands, requests, and/or parameters provided by the user. In some implementations, the processing may be minimal or there may be no processing at all. For example, the processing may include encoding the verbal input audio for transmission to server 114, or preparing the captured raw audio of the verbal input for transmission to server 114.

The device transmits (506) a request to a remote system, the request including information determined based on the verbal input. The client device 104/casting device 106 determines a request from the verbal input by processing the verbal input to identify the request and one or more associated parameters from the verbal input. The client device 104/casting device 106 transmits the determined request to the remote system (e.g., server 114), where the remote system determines and generates a response to the request. In some implementations, the client device 104/casting device 106 transmits the verbal input (e.g., as an encoded audio, as raw audio data) to the server 114, and the server 114 processes the verbal input to determine the request and associated parameters.

The device receives (508) a response to the request, where the response is generated by the remote system in accordance with the information based on the verbal input. The remote system (e.g., the server 114) determines and generates a response to the request, and transmits the response to the client device 104/casting device 106.

The device performs (510) an operation in accordance with the response. The client device 104/casting device 106 performs one or more operations in accordance with the received response. For example, if the response is a command to the device to output certain information by audio, the client device 104/casting device 106 retrieves the information, converts the information to speech audio output, and outputs the speech audio through the speaker. As another example, if the response is a command to the device to play media content, the client device 104/casting device 106 retrieves the media content and plays the media content.

One or more of the receiving, processing, transmitting, receiving, and performing are performed by one or more voice processing modules of a voice assistant library executing on the electronic device, the voice processing modules providing a plurality of voice processing operations that are accessible to one or more application programs and/or operating software executing or executable on the electronic device (512). The client device 104/casting device 106 may have a voice assistant client library 240 that includes functions and modules for performing one or more of the receiving, processing, transmitting, receiving, and performing steps. The modules of the voice assistant client library 240 provide multiple voice processing and assistant operations that are accessible to applications, operating systems, and platform software at the client device 104/casting device 106 that include or link to the library 240 (e.g., run the library 240 and related APIs).

In some implementations, at least some voice processing operations associated with the voice processing modules are performed on the remote system, which is interconnected with the electronic device via a wide area network. For example, the processing of the verbal input to determine the request may be performed by the server 114, which is connected with the client device 104/casting device 106 through network(s) 112.

In some implementations, the voice assistant library is executable on a common operating system that is operable on a plurality of different device types, thereby enabling portability of voice-enabled applications configured to interact with one or more of the voice processing operations. The voice assistant client library 240 (and related libraries and APIs, e.g., debugging library 242, platform API 244, POSIX API 246) use standard elements (e.g., objects) of a predefined operating system (e.g., Linux), and thus is operable on a variety of devices that run a distribution or flavor of the predefined operating system (e.g., different Linux or Linux-based distributions or flavors). In this manner, voice assistant functionality is available to a variety of devices and the voice assistant experience is consistent across the variety of devices.

In some implementations, the request and response may be handled at the device. For example, for basic functions that may be local to the device such as timers, alarm clocks, clocks, and volume control, the client device 104/casting device 106 may process the verbal input and determine that the request corresponds to one of these basic functions, determine the response at the device, and perform one or more operations in accordance with the response. The device may still report the request and response to the server 114 for logging purposes.

In some implementations, a device-agnostic voice assistant library for electronic devices including an audio input system, includes one or more voice processing modules configured to execute on a common operation system implemented on a plurality of different electronic device types, the voice processing modules providing a plurality of voice processing operations that are accessible to application programs and operating software executing on the electronic devices, thereby enabling portability of voice-enabled applications configured to interact with one or more of the voice processing operations. The voice assistant client library 240 is a library that can be run on a variety of devices that share the same predefined operating system base as the library (e.g., the library and device operating system are Linux-based), thus the library is device-agnostic. The library 240 provides multiple modules for voice assistant functionality that is accessible to applications across the variety of devices.

In some implementations, at least some voice processing operations associated with the voice processing modules are performed on a backend server interconnected with the electronic devices via a wide area network. For example, the library 240 includes modules that communicate with the server 114 to transmit the verbal input to the server 114 for processing to determine the request.

In some implementations, the voice processing operations include device-specific operations configured to control devices coupled (e.g., directly or communicatively) with the electronic devices. The library 240 may include functions or modules for controlling other devices coupled to the client device 104/casting device 106 (e.g., wireless speakers, smart television, etc.)

In some implementations, the voice processing operations include information and media request operations configured to provide requested information and/or media content to a user of the electronic devices or on devices coupled (e.g., directly or communicatively) with the electronic devices. The library 240 may include functions or modules for retrieving information or media and providing the information or media (e.g., read email out loud, read news articles out loud, play streaming music) on the client device 104/casting device 106 or on a coupled device.

It will be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Reference will now be made in detail to various implementations, examples of which are illustrated in the accompanying drawings. In the following detailed description, numerous specific details are set forth in order to provide a thorough understanding of the invention and the described implementations. However, the invention may be practiced without these specific details. In other instances, well-known methods, procedures, components, and circuits have not been described in detail so as not to unnecessarily obscure aspects of the implementations.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method, comprising:
at an electronic device having a first device type and comprising an audio input system, one or more processors, and memory storing one or more programs for execution by the one or more processors:

downloading a device-agnostic voice assistant library configured to execute across a plurality of different electronic device types, including the first device type, wherein the voice-assistant library includes a plurality of voice processing modules, each of the voice processing modules providing one or more voice processing operations that are accessible to application programs executing or executable on the different electronic device types;

configuring the device-agnostic voice assistant library to execute on the electronic device based on the electronic device having the first device type, including:

selecting an implementation for the voice assistant library based on the electronic device having the first device type, wherein the implementation for the voice assistant library is selected from a group consisting of: in an application installed on the electronic device, in an operating system of the electronic device, and in firmware of the electronic device;

after the configuring, receiving, via a microphone of the audio input system, a verbal input from a user;

extracting request information from the verbal input by processing the verbal input using the device-agnostic voice assistant library executing on the electronic device;

transmitting a request to a remote system, the request including the extracted request information;

receiving a response to the request, wherein the response is generated by the remote system in accordance with the extracted request information; and performing an operation in accordance with the response by one or more voice processing modules of the configured voice assistant library.

2. The method of claim 1, wherein at least some voice processing operations associated with the voice processing modules are performed on the remote system, which is interconnected with the electronic device via a wide area network.

3. The method of claim 1, wherein processing the verbal input comprises performing speech processing on the verbal input, and the speech processing is performed by a module of the voice processing modules of the voice assistant library.

4. The method of claim 1, wherein processing the verbal input comprises performing audio input processing on audio data of the verbal input, and the audio input processing is performed by a module of the voice processing modules of the voice assistant library.

5. The method of claim 1, wherein performing an operation in accordance with the response comprises decoding audio, and the audio decoding is performed by a module of the voice processing modules of the voice assistant library.

6. The method of claim 1, further comprising:

at a second electronic device having a second device type, distinct from the first device type:

downloading the device-agnostic voice assistant library;

configuring the device-agnostic voice assistant library to execute on the second electronic device based on the second electronic device having the second device type;

after the configuring the device-agnostic voice assistant library, receiving a second verbal input from a second user; and performing a second operation at the second electronic device in response to the second verbal input by one or more voice processing modules of the configured voice assistant library.

7. The method of claim 1, wherein performing the operation comprises outputting an audible response to the user via the audio input system.

8. The method of claim 1, wherein configuring the device-agnostic voice assistant library includes enabling a voice assistant functionality on the electronic device.

9. A device-agnostic voice assistant library for electronic devices that include respective audio input systems, comprising:

one or more implementation modules configured to implement the voice assistant library across each of a plurality of different electronic devices based on a corresponding device type, wherein the implementation for the voice assistant library is selected from a group consisting of: in an application installed on the electronic device, in an operating system of the electronic device, and in firmware of the electronic device;

a plurality of voice processing modules, each of the voice processing modules providing one or more voice processing operations that are accessible to application programs executing or executable on the different electronic device types; and one or more application programming interfaces (APIs) configured to provide interfaces between the plurality of voice processing operations and hardware and/or software of the electronic devices;

whereby the one or more voice processing modules and APIs enable portability across the plurality of different electronic device types of voice-enabled applications configured to interact with one or more of the voice processing operations.

10. The voice assistant library of claim 9, wherein at least some voice processing operations associated with the voice processing modules are performed on a backend server interconnected with the electronic devices via a wide area network.

11. The voice assistant library of claim 10, wherein the voice processing operations include device-specific operations configured to control devices coupled with the electronic devices.

12. The voice assistant library of claim 10, wherein the voice processing operations include information and media request operations configured to provide requested information and/or media content to users of the respective electronic devices, or on devices coupled with the respective electronic devices.

13. The voice assistant library of claim 9, wherein the plurality of voice processing operations comprises hotword detection.

14. The voice assistant library of claim 9, wherein the plurality of voice processing operations comprises speech processing.

15. The voice assistant library of claim 9, wherein the plurality of voice processing operations comprises audio input processing.

16. An electronic device having a first device type, comprising:

an audio input system;

one or more processors; and memory storing one or more programs to be executed by the one or more processors, the one or more programs comprising instructions for:

downloading a device-agnostic voice assistant library configured to execute across a plurality of different electronic device types, including the first device type, wherein the voice-assistant library includes a plurality of voice processing modules, each of the voice processing modules providing one or more voice processing operations that are accessible to application programs executing or executable on the different electronic device types;

configuring the device-agnostic voice assistant library to execute on the electronic device based on the electronic device having the first device type of the plurality of different electronic device types, including:

selecting an implementation for the voice assistant library based on the electronic device having the first device type, wherein the implementation for the voice assistant library is selected from a group consisting of: in an application installed on the electronic device, in an operating system of the electronic device, and in firmware of the electronic device;

after the configuring, receiving, via a microphone of the audio input system, a verbal input from a user;

extracting request information from the verbal input by processing the verbal input using the device-agnostic voice assistant library executing on the electronic device;

transmitting a request to a remote system, the request including the extracted request information;

receiving a response to the request, wherein the response is generated by the remote system in accordance with the extracted request information; and performing an operation in accordance with the response by one or more voice processing modules of the configured voice assistant library.

17. The device of claim 16, comprising instructions for performing hotword detection on the verbal input, wherein the instructions for performing hotword detection on the verbal input are included in a module of the voice processing modules of the voice assistant library.

18. The device of claim 16, comprising instructions for performing speech processing on the verbal input, wherein the instructions for performing speech processing on the verbal input are included in a module of the voice processing modules of the voice assistant library.

19. The device of claim 16, comprising instructions for performing audio input processing on audio data of the verbal input, wherein the instructions for performing audio input processing on audio data of the verbal input are included in a module of the voice processing modules of the voice assistant library.

20. The device of claim 16, wherein the plurality of voice processing modules includes a ducking module, the ducking module providing a ducking operation that is accessible to application programs executing or executable on the different electronic device types, the ducking operation including:

while the electronic device is producing an audible output, receiving an activation input to the electronic device indicating that a user is about to submit verbal input to the electronic device; and in response to the activation input, adjusting by the electronic device the audible output from the first volume level to a second volume level, less than the first volume level.

* * * * *